United States Patent [19]
Sonobe et al.

[11] Patent Number: 4,758,086
[45] Date of Patent: Jul. 19, 1988

[54] APPARATUS FOR MEASURING SPECTRAL POWER OF A LIGHT BEAM

[75] Inventors: Youji Sonobe, Machida; Seiichi Ishigaki, Atsugi; Tomoyuki Kikugawa, Yokohama, all of Japan

[73] Assignee: Anritsu Corporation, Tokyo, Japan

[21] Appl. No.: 7,350

[22] Filed: Jan. 27, 1987

[30] Foreign Application Priority Data

Jul. 31, 1985 [JP] Japan .................. 60-168975

[51] Int. Cl.<sup>4</sup> .............................................. G01J 3/30
[52] U.S. Cl. .................................... 356/327; 356/328
[58] Field of Search ............... 356/326, 327, 328, 225, 356/226, 319

[56] References Cited

PUBLICATIONS

Moore, *SPIE*, vol. 234, New Developments and Applications in Optical Radiation Measurements (Sira), 1980, pp. 86–90.

*Primary Examiner*—F. L. Evans

*Attorney, Agent, or Firm*—Frishauf, Holtz, Goodman & Woodward

[57] ABSTRACT

In an optical measuring apparatus, a laser beam is transferred to a diffraction grating so that the laser beam is spectrally separated into respective wavelength components. The wavelength components are sequentially guided into a polarizing optical element in which the respective wavelength component are separated into S and P polarized components, when the diffraction grating is rotated. The S and P polarized components of the respective wavelengths are detected by photodetectors and electrical signals from the photodetectors are supplied to a signal processing unit. In the signal processing unit, the electrical signals corresponding to the P and S components are corrected with a spectral efficiency characteristic of the grating, a percent loss characteristic of the polarizing element and photoelectro conversion characteristics of the photodetectors and the corrected signals are analyzed to obtain an absolute value of the laser energy for the respective wavelength.

8 Claims, 4 Drawing Sheets

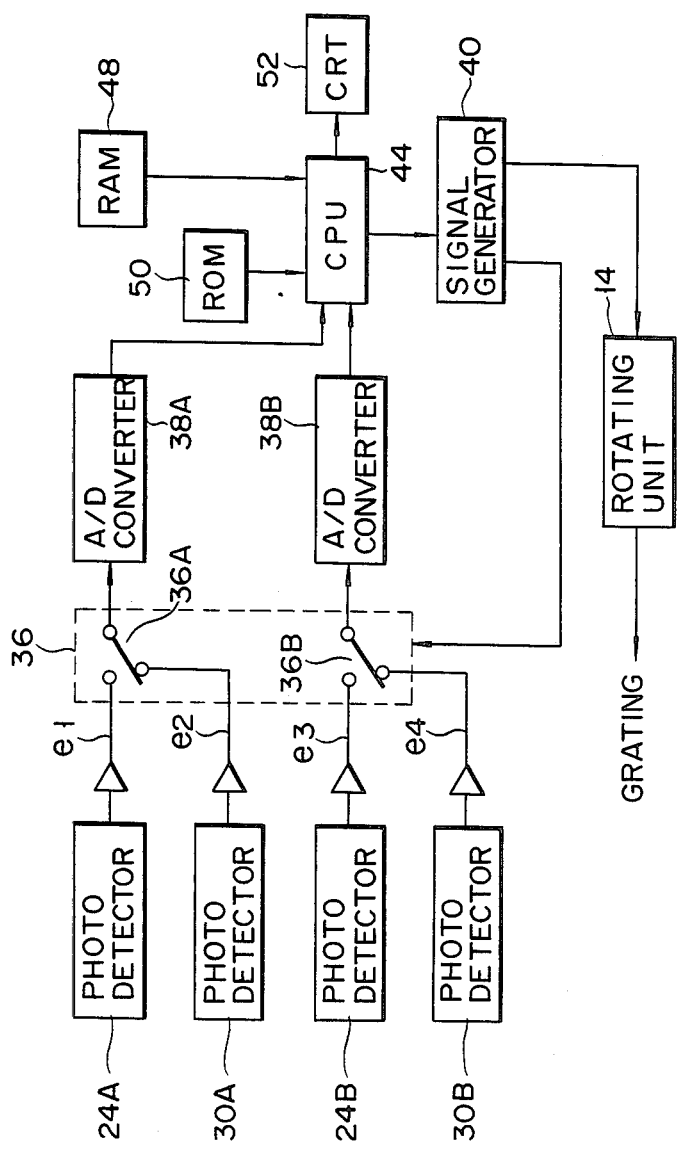
F I G. 5

APPARATUS FOR MEASURING SPECTRAL POWER OF A LIGHT BEAM

BACKGROUND OF THE INVENTION

This invention relates to an optical measuring apparatus for measuring an absolute intensity of a light beam and, in particular, a spectrometer for measuring a spectral distribution.

A spectrometer is known as an optical measuring apparatus in which case a light beam is incident on a diffraction grating to permit it to be separated into respective light beams. Upon the rotation of the grating, the light beam components having the respective wavelengths are successively sent to photodetectors where the beam intensity of the respective wavelengths is measured in which case the photodetector is located in a specified direction to the grating. As a result, measurement is made of the spectral distribution of the light beams which has been measured by the spectrometer.

In this known spectrometer, the spectral distribution of the light beam can exactly be measured since the light beam components which have been diffracted by the diffraction grating are introduced into the photodetector. That is, a spectral element, such as a diffraction grating, has the characteristic of which the spectral efficiency differs depending upon the polarized components of the light beam. Now suppose that, for example, a light beam of a certain wavelength λ having a relative output power of 10 is splitted at the diffraction grating. Even in this case, the photodetector detects a relative output power of 5 if the light beam contains more S polarization components than P polarization components and detects a relative output power of 3 if the light beam contains more P polarization components than S polarization components. This phenomenon is observed as the special characteristic of a diffraction grating shown in FIG. 1. In FIG. 1, Pa denotes a spectral characteristic for a P polarization component having a deflection plane parallel to the grooves of the diffraction grating, which Sa denotes a spectral characteristic for a P polarization component having a deflection plane perpendicular to the grooves of the diffraction grating. As evident from the characteristic graph of FIG. 1, since the conventional optical measuring apparatus is of such a type that light beam components simply diffracted at the diffraction grating are introduced directly into the photodetectors, the absolute power of the light beam cannot be precisely measured since that spectral efficiency differs depending upon the ratio between the wavelength and the deflection components of the light means.

SUMMARY OF THE INVENTION

It is accordingly the object of this invention to provide an optical measuring apparatus which can accurately measure the absolute power of a light beam without being adversely affected by the deflection characteristic inherent in a spectrally analyzing optical element.

According to this invention there is provided an optical measuring apparatus for measuring the spectral distribution energy of a light beam, comprising:

a first separating means having a specific spectral efficiency characteristic for spectrally separating a to-be-measured light beam into respective wavelength components;

a second separating means having a specific percent loss characteristic for each of the wavelength components, for sequentially separating the separated wavelength components into at least two polarized beam components at which time the separated wavelength components are attenuated due to the specific percent loss characteristic;

detecting means having a specific photoelectro conversion characteristic with respect to each of the wavelength components, for detecting the separated polarized beam components to convert the separated polarized beam components into electric signals; and means for correcting the electric signals with the spectral efficiency characteristic, percent loss characteristic and photoelectro conversion characteristic and for analyzing an absolute value of output light power for the respective separated wavelength component.

BRIEF DESCRIPTION OF THE DRAWINGS

FIG. 5 is a block diagram showing a measuring circuit for the optical measuring apparatus according to said one embodiment of this invention;

DETAILED DESCRIPTION OF THE PREFERRED EMBODIMENTS

Figure 2:
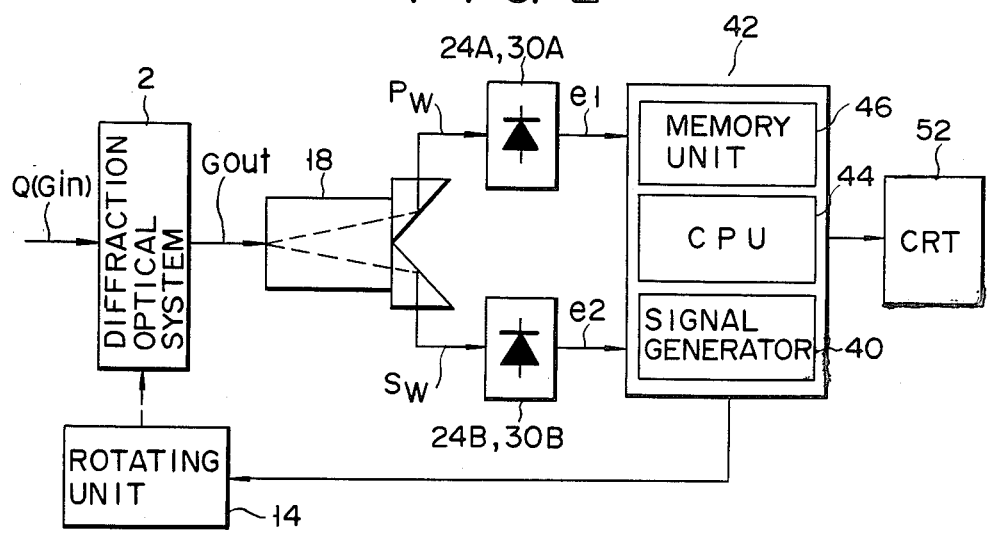
FIG. 2 shows a diffraction optical system for an optical measuring apparatus according to one embodiment of this invention.

A light beam to be measured is introduced into diffraction optical system 2 as shown in FIG. 2. This diffraction optical system has an optical arrangement as shown, for example, in FIG. 3. That light beam from a light source, for example, a semiconductor laser, is conducted through optical fiber 4 to optical connector 6 and thence to concave mirror 8 where it is reflected. The reflected laser beam converges at diffraction grating 10 where it is diffracted to allow it to be separated into various beam wavelength components. The various wavelength components irradiated from grating 10 are directed in their respective specific directions. Some of these wavelength components are reflected on concave mirror 12 where it is directed at concave mirror 14. Here, when diffraction grating 10 is rotated by rotating unit 14 at low speed as indicated by an arrow I in FIG. 3, then the various wavelength components directed in their respective directions from grating 10 are sequentially transferred through concave mirror 12 to concave mirror 14. The wavelength component reflected on concave mirror 14 is introduced into a polarized wave separation optical system. The reflected wavelength component is converted into a substantially parallel light rays by a combination lens system, which is comprised of convex and concave lenses 16 in the polarized light wave separation optical system, and then is incident onto one end of a polarizing optical element, such as calcite 18. While the light beam transmits through calcite 18, it is directed in the different directions with some of it as ordinary light beams (for example, P polarized light beam components) and some as extraordinary light beam (for example, S polarized light beam components). In this case these ordinary and extraordinary light beams are completely separated, as such, at the other end of calcite 18. As shown in FIG. 4, at the other end of calcite 18, total reflection surfaces 20A and 20B are formed in an intersecting fashion with one located above and the other below, noting that the P polarized light component is reflected on total reflection surface 20A and that the S polarized light component is reflected on total reflection surface 20B. The P and S polarized light beams emerging from total reflection surfaces 20A and 20B are directed toward half-mirrors 22A and 22B, respectively, where each is splitted into first and second light components. The first light components reflected on half-mirrors 22A and 22B converge, respectively by convex lenses 26, at their photodetectors 24A and 24B where each first light beam is detected. Second light rays reflected on half-mirrors 22A and 22B pass through corresponding filters 28 in which case only long waveform components are filtered. The second light rays of long waveform, after passing through corresponding convex lenses 32, converge at photodetectors 30A and 30B, respectively, where the long wavelength beam is detected. Here, photodetectors 24A and 24B for shor wavelength are adapted to detect a short wavelength component of, for example, 0.6 to 1.0 $\mu$m, whereas photodetectors 30A and 30B for long wavelength are adapted to detect a long wavelength component of, for example, 0.9 to 1.8 $\mu$m, noting that filters 28 filters a long wavelength component of, for example, 0.9 $\mu$m or over. Lenses 16, 26 and 32, calcite 18, half-mirrors 22A and 22B and photodetectors 24A, 24B and 30A and 30B are adjustably mounted on base 34 as shown in FIG. 4.

As shown in FIG. 5, photodetectors 24A, 30A and 24B, 30B are connected respectively through corresponding preamplifiers to first and second switches 36A and 36B in switching unit 36. Switching unit 36 is operated responsive to a switching signal from signal generator 40 so that, at the time of detecting short wavelength light beams, photodetectors 24A and 24B are coupled respectively through first and second switches 36A and 36B to first and second A/D converters 38A and 38B and that, at the time of detecting long wavelength light beams, photodetectors 30A and 30B are coupled respectively through first and second switches 36A and 36B to first and second A/D converters 38A and 38B. That is, at the time of detecting the short wavelength light beams, the short wavelength light beams are converted by photodetectors 24A and 24B into photoelectric signals which are in turn supplied through first and second switches 36A and 36B to first and second A/D converters 38A and 38B where they are converted to digital signals. The digital signals are supplied to CPU 44 in signal processing unit 42. Similarly, at the time of detecting the long wavelength light beams, the long wavelength light beams are converted by photodetectors 30A and 30B into electric signals which are in turn supplied through first and second switches 36A and 36B to first and second A/D converters 38A and 38B where they are converted to digital signals. The digital signals are supplied to CPU 44 in signal processing unit 42. Data processed by CPU 44 is stored in RAM 48 in memory unit 46 and data stored in RAM 48 is corrected by CPU 44 with the use of the aforementioned processed data thus stored in ROM 50. By so doing, the light beam generated from the light source is spectrally analyzed so that it is displayed on display section 52 of a CRT, etc.

Figure 1:
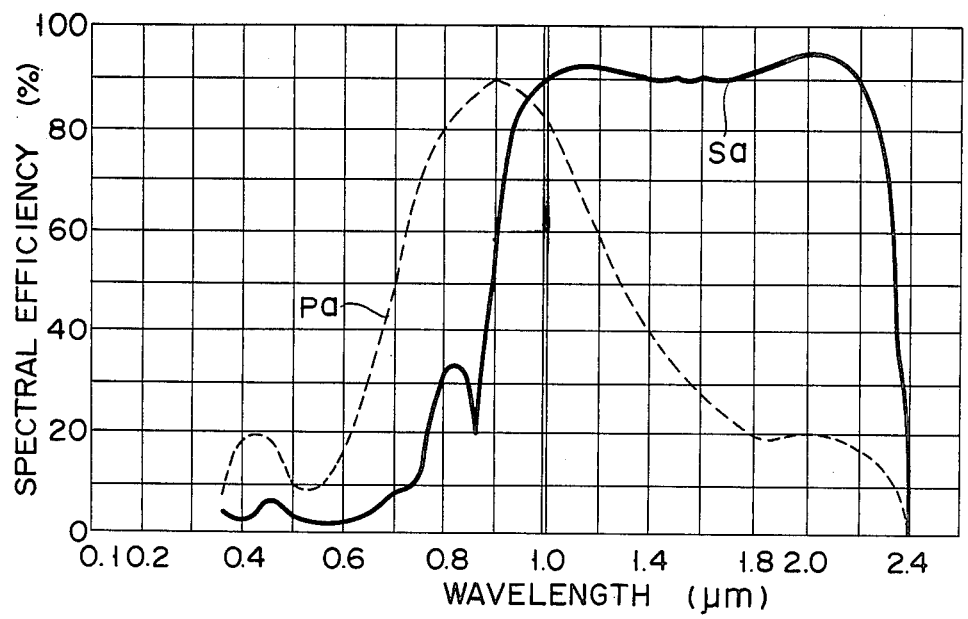
FIG. 1 is a graph showing a relation between spectral efficiency for polarized components of a spectrally analyzing optical element with the wavelength.
Figure 6:
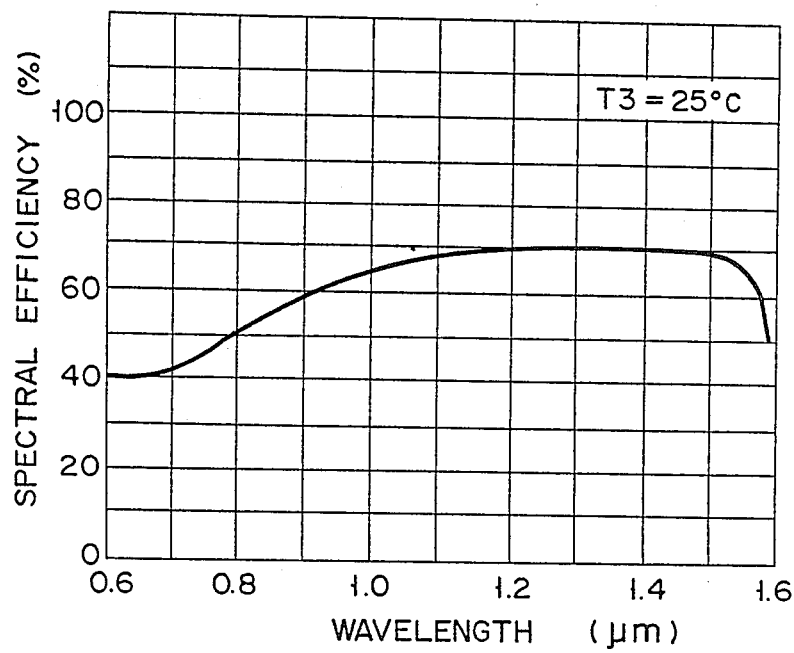
FIG. 6 is a graph showing a relation between a photoelectric conversion efficiency of photodetector shown in FIG. 5 and the wavelength.

ROM 50 stores, as processed data, measured data which are initially obtained with respect to analytical equation data as will be set out below and optical property data of diffraction grating 10, polarizing optical element 18, and photodetectors 24A, 24B, 30A and 30B, that is, with respect to the diffraction efficiencies $A_P$ and $4B_S$ for the P and S polarizing components of various wavelengths as shown in FIG. 1, percent losses $C_P$ $D_S$ of the P and S polarizing components of various wavelengths in polarizing element 18, and photoelectrical conversion efficiencies L1 and L2 of photodetectors 24A, 24B, 30A and 30B for P and S polarizing components of various wavelengths as shown in FIG. 6.

The measuring operation of the aforementioned optical measuring apparatus will be explained below.

Figure 3:
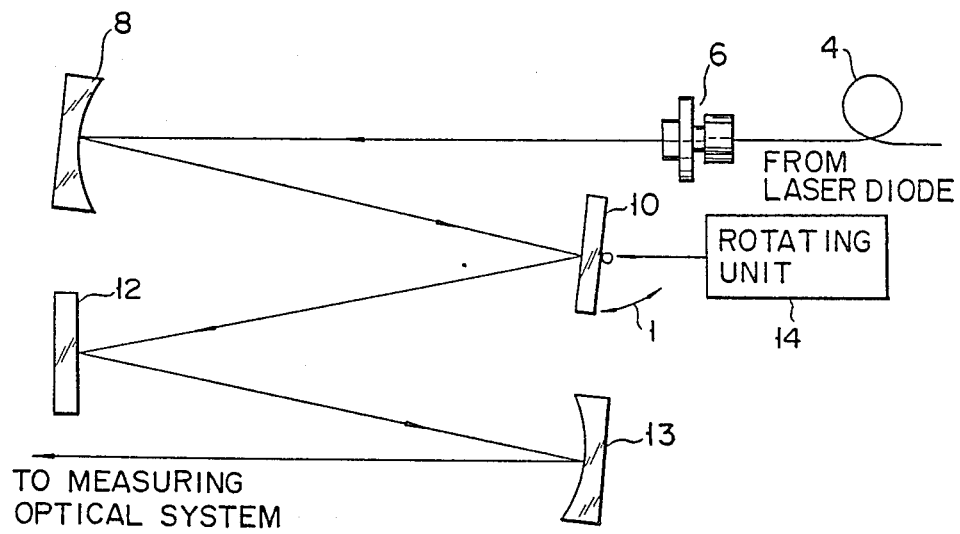
FIG. 3 is a plan view showing a diffraction optical system for the optical measuring apparatus of FIG. 2.
Figure 4:
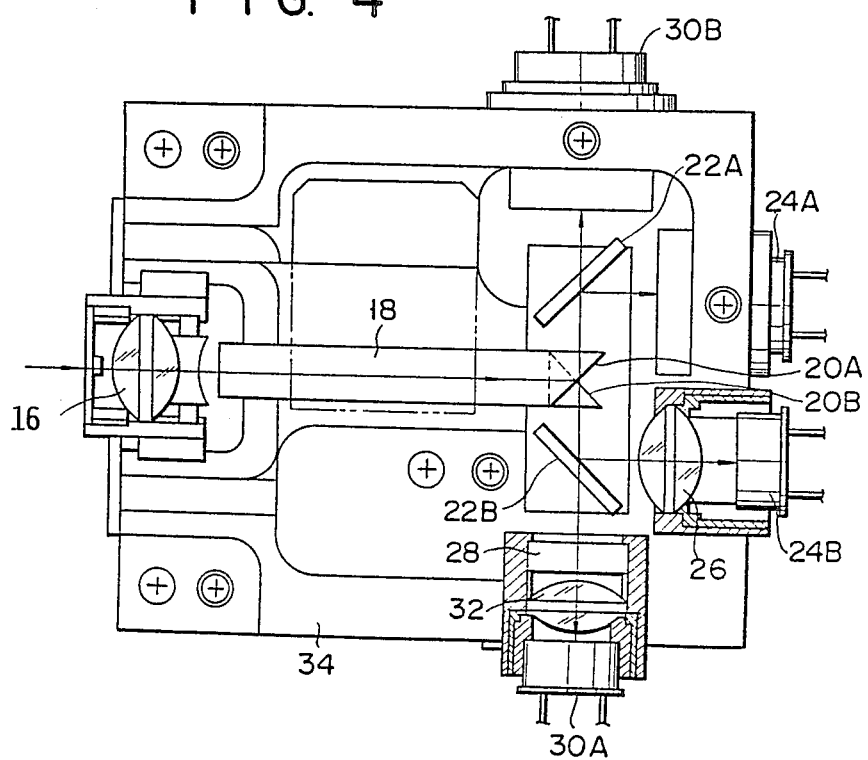
FIG. 4 is a plan view showing a measuring optical unit for the optical measuring apparatus shown in FIG. 2.

When a light beam to be measured is introduced into a diffraction optical system as shown in FIG. 3, then a light beam Q is separated by the diffraction grating into respective wavelength components. Upon receipt of a command from CPU 44, signal generator 40 delivers a rotating signal to rotating unit 14 to permit the grating to rotate at low speed. In this way, the light beam components ranging from a short to a long wavelength are sequentially introduced into the measuring optical apparatus as shown in FIG. 4. In this measuring optical apparatus, the light rays are separated into P and S components by the polarizing optical element. These components are detected by photodetectors 24A, 24B, 30A and 30B. In the short wavelength detection mode, signal generator 40 delivers a first switching signal upon receipt of a command from CPU 44. Switching unit 36 is actuated responsive to the switching signal whereby photodetectors 24A and 24B are coupled to A/D converters 38A and 38B, respectively. As a result, first and second electric signals $e_1$ and $e_2$ corresponding to P and S polarized light beams are supplied to A/D converters 38A and 38B where they are converted to digital data. The digital data are sequentially stored in RAM 48. When diffraction grating 10 are rotated through a certain angle, switching is made from a short to a long wavelength mode. That is, when a rotating signal is generated from signal generator 40 for a predetermined time interval, then a mode switching signal is sent fom CPU 44 to the signal generator. Upon the issuance of a command from CPU 44, signal generator 40 delivers a second switching signal to switching unit 36 and thus switching unit 36 is actuated responsive to the switching signal to cause photodetectors 30A and 30B to be coupled to A/D converters 38A and 38B. Thus, third and fourth electric signals $e_3$ and $e_4$ corresponding to P and S polarized light beams of longer wavelength are supplied to A/D converters 39A and 38B where they are converted to digital data. The digital data of longer waveform corresponding to third and fourth electric signals are sequentially stored in RAM 48. The digital data of short and long wavelengths are processed based on the optical property data of the grating etc. and analytical equation data stored in ROM 50 and the absolute output power of the measured light beams is computed, the result of which is displayed on CRT 52. The aforementioned analytical equation data can be expressed by an equation (1).

$$Gin = (e_1/Ap \cdot Cp \cdot L1) + (e_2/B_S \cdot D_S \cdot L2)$$

or $$Gin = (e_3/Ap \cdot Cp \cdot L1) + (e_4/B_S \cdot D_S \cdot L2) \qquad (1)$$

Equation (1) will now be explained below.

If Gin represents the input energy level of a given wavelength component of a light beam to be measured, $$Gin = Pin + Sin \qquad (2)$$

since the input power level Gin is separated into P and S polarized beam components having levels Pin and Sin.

If G out represents the output energy level of the wavelength components emerging from grating 10, $$Gout = Ap \cdot Pin + B_S \cdot Sin \qquad (3)$$

The respective wavelength components diffracted at diffraction optical system are sent to polarizing optical element 18 where each is separated into P and S polarized beam components. Here the respective output energies of the respective polarized beam components are given below:

$$P_W = Ap \cdot Pin \cdot Cp \qquad (4)$$

$$S_W = B_S \cdot Sin \cdot D_S \qquad (5)$$

The electric signals $e_1$ and $e_2$ generated from the photodetectors having the photoelectrical conversion efficiencies L1 and L2 are given below:

$$e_1 = L1 \cdot P_W \qquad (6)$$

$$e_2 = L2 \cdot S_W \qquad (7)$$

From Equations (1) and (2), Gin in Equation (1) can be reduced to:

$$Gin = (e_3/Ap \cdot Cp \cdot L1) + (e_4/B_S \cdot D_S \cdot L2)$$

Figure 7:
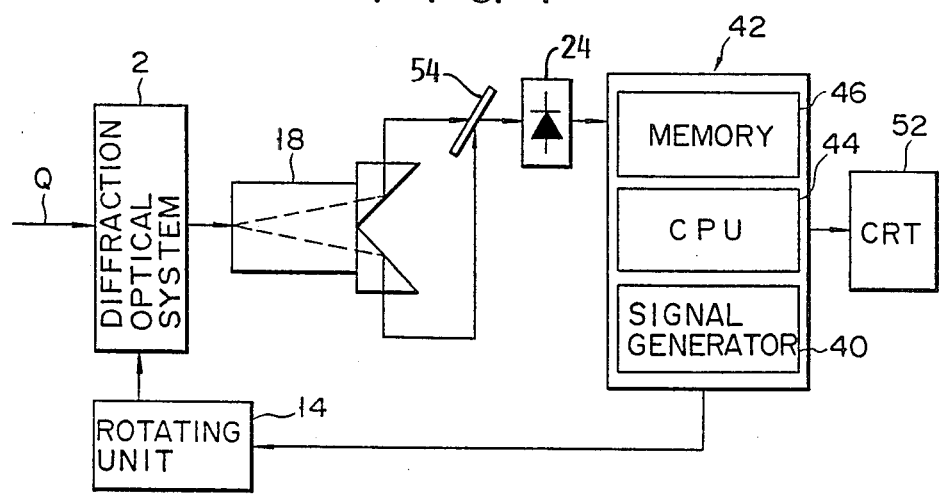
FIG. 7 is a block showing an optical measuring apparatus according to another embodiment of this invention.

The optical measuring apparatus may be so configured so to have arrangement shown in FIG. 7. In the apparatus shown in FIG. 7, P and S polarized beam components separated at a polarized element are introduced into optical switch 54 and they are alternatively introduced into photodetector 24. That is, the P polarized beam component is incident onto photodetector 24 when optical switch 54 is turned OFF and the S polarized beam component is incident onto photodetector 24. In this way, electric signals $e_1$ and $e_2$ corresponding to the P and S polarized beam components are alternately generated from photodetector 24 in a time-division fashion and processed to obtain an absolute output energy of the light beam.

Although, in the aforementioned embodiment, grating 10 has been explained as being used as a spectrally analyzing optical element, it will be evident that an acoustooptical element may be used instead.

What is claimed is:

1. Apparatus for measuring spectral power of a light beam, comprising:
   first separating means having a specific spectral efficiency characteristic for spectrally separating a to-be-measured light beam into respective wavelength components;
   second separating means having a specific percent loss characteristic for each of the wavelength components, for sequentially separating the separated wavelength components into at least two polarized beam components at which time the separated wavelength components are attenuated due to the specific percent loss charactersitic;
   detecting means having a specific photoelectro conversion characteristic with respect to each of the wavelength components for detecting said separated polarized beam components to convert the separated polarized beam components into electric signals; and
   means for correcting the electric signals with the spectral efficiency characteristic, percent loss characteristic and photoelectro conversion characteristic and for analyzing an absolute value of an output light energy for the respective separated wavelength component.

2. The apparatus according to claim 1, wherein said second separating means comprises of beam deflecting means for separating the wavelength components into P and S polarized beam components.

3. The apparatus according to claim 1, further comprising an optical switching means located between said second separating means and detecting means for alternately directing the separated polarized beam components from said second separating means to said detecting means.

4. The apparatus according to claim 1, wherein said first separating means includes a spectrally analyzing optical element for receiving said to-be-measured light beam and for separating the wavelength components; and means for taking out, one by one, said wavelength components which have been separated.

5. The apparatus according to claim 4, wherein said spectrally analyzing optical element comprises a diffraction grating; and said means for taking out said wavelength components comprises a unit for rotating said diffraction grating and optical system located in a specific positional relation to said diffraction grating.

6. The apparatus according to claim 1, wherein said detecting means includes first and second detectors for detecting the light beams containing short and long wavelengths, respectively.

7. The apparatus according to claim 6, further comprising electric switch means for coupling said first detector for detecting said short wavelength component to said correcting means at the detection of the short wavelength component, and for coupling said second detector for detecting said long wavelength components to said correcting means at the detection of the long wavelength component.

8. The apparatus according to claim 6, further comprising a memory for storing data on said spectral efficiency characteristic, percent loss characteristic and photoelectro conversion characteristic; and means for processing the electric signals with the stored data.

* * * * *

UNITED STATES PATENT AND TRADEMARK OFFICE
CERTIFICATE OF CORRECTION

PATENT NO. : 4,758,086

DATED : July 19, 1988

INVENTOR(S) : SONOBE et al

It is certified that error appears in the above-identified patent and that said Letters Patent is hereby corrected as shown below:

Title page, left-hand column, delete "Foreign Application Priority Data - Jul. 31, 1985  Japan 60-168975"

Signed and Sealed this

Twenty-seventh Day of June, 1989

*Attest:*

DONALD J. QUIGG

*Attesting Officer*  *Commissioner of Patents and Trademarks*